(12) United States Patent
Schaefer et al.

(10) Patent No.: US 9,698,911 B2
(45) Date of Patent: Jul. 4, 2017

(54) SYSTEMS, DEVICES, AND METHODS FOR PHOTONIC TO RADIO FREQUENCY DOWNCONVERSION

(71) Applicant: Lockheed Martin Corporation, Bethesda, MD (US)

(72) Inventors: Andrew F. Schaefer, Binghamton, NY (US); Paul T. Coyne, Endicott, NY (US); John C. Ceccherelli, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/788,785

(22) Filed: Jun. 30, 2015

(65) Prior Publication Data

US 2017/0005732 A1 Jan. 5, 2017

(51) Int. Cl.
*H04B 10/50* (2013.01)
*H04B 10/564* (2013.01)

(52) U.S. Cl.
CPC ......... *H04B 10/503* (2013.01); *H04B 10/564* (2013.01)

(58) Field of Classification Search
None
See application file for complete search history.

(56) References Cited

U.S. PATENT DOCUMENTS

| 5,572,873 A | 11/1996 | Lavigne |
| 5,603,220 A | 2/1997 | Seaman |
| 5,822,102 A | 10/1998 | Bodeep et al. |
| 6,476,957 B1 | 11/2002 | Ward et al. |
| 7,245,833 B1 | 7/2007 | Volkening |

(Continued)

FOREIGN PATENT DOCUMENTS

| EP | 2315074 A1 | 8/1993 |
| WO | WO/2008/134436 A1 | 8/1993 |

(Continued)

OTHER PUBLICATIONS

Vikram Sekar, Kamran Entesari. Inductively-loaded RF MEMS Reconfigurable Filters, International Journal of RF and Microwave Computer-Aided Engineering, 2009.

(Continued)

*Primary Examiner* — Ken N Vanderpuye
*Assistant Examiner* — Mina Shalaby
(74) *Attorney, Agent, or Firm* — Miles & Stockbridge P.C.

(57) ABSTRACT

A system, method, and device for RF upconversion. The system can include a laser, two EAMs, a photonic filter, a photonic service filter, two photodiodes, and a mixer. The first EAM can convert a received RF signal into the photonic domain by modulating an optical signal (received from the laser) based on the received RF signal to output a modulated optical signal. The photonic filter can output a filtered optical signal based on the modulated optical signal to the first photodiode which can output a filtered RF signal in the RF domain. The second EAM can output an LO modulated optical signal based on a received LO to the service filter which can output a filtered LO optical signal to the second photodiode which can output a filtered LO signal in the RF domain. The mixer can mix the filtered RF and LO signals to generate an IF signal.

20 Claims, 6 Drawing Sheets

(56) References Cited

U.S. PATENT DOCUMENTS

| | | | |
|---|---|---|---|
| 8,061,149 | B1 | 11/2011 | Gowans |
| 8,472,806 | B2 | 6/2013 | Woodward et al. |
| 8,538,270 | B2 | 9/2013 | Seidel et al. |
| 8,593,581 | B2 | 11/2013 | Mccarthy et al. |
| 2002/0021463 | A1 | 2/2002 | Turner |
| 2002/0075546 | A1* | 6/2002 | Webb .................. H04B 10/505 398/182 |
| 2002/0076132 | A1 | 6/2002 | Peral et al. |
| 2003/0002046 | A1 | 1/2003 | Myers |
| 2003/0142701 | A1 | 7/2003 | Pontis |
| 2003/0142702 | A1 | 7/2003 | Pontis |
| 2004/0211900 | A1 | 10/2004 | Johnson |
| 2004/0218931 | A1 | 11/2004 | Frederiksen |
| 2006/0034616 | A1 | 2/2006 | Tipper |
| 2006/0239686 | A1 | 10/2006 | Hillis et al. |
| 2008/0106780 | A1 | 5/2008 | Niiho |
| 2008/0187319 | A1 | 8/2008 | Stewart |
| 2008/0273561 | A1 | 11/2008 | Fu |
| 2009/0003840 | A1 | 1/2009 | Nahapetian |
| 2009/0036077 | A1 | 2/2009 | Woodward et al. |
| 2009/0268766 | A1 | 10/2009 | Ishibashi |
| 2009/0297155 | A1* | 12/2009 | Weiner .................. H04B 1/40 398/115 |
| 2009/0324251 | A1* | 12/2009 | Ilchenko .............. G02F 1/011 398/183 |
| 2010/0054757 | A1 | 3/2010 | Smith |
| 2010/0230621 | A1 | 9/2010 | Rideout |
| 2011/0059709 | A1 | 3/2011 | Collins, III |
| 2011/0150485 | A1 | 6/2011 | Seidel et al. |
| 2012/0002972 | A1 | 1/2012 | Stiffler et al. |
| 2012/0293959 | A1 | 11/2012 | Trudel |
| 2013/0236187 | A1* | 9/2013 | Middleton ............ H04B 10/00 398/116 |
| 2015/0110494 | A1 | 4/2015 | Ghelfi et al. |
| 2016/0245557 | A1 | 8/2016 | Schaefer et al. |
| 2016/0248609 | A1 | 8/2016 | Schaefer et al. |
| 2017/0003524 | A1 | 1/2017 | Schaefer et al. |

FOREIGN PATENT DOCUMENTS

| | | |
|---|---|---|
| WO | WO/2007/053477 A3 | 10/2010 |
| WO | WO/2013/117216 A1 | 8/2013 |

OTHER PUBLICATIONS

Kamran Entesari, Gabriel M. Rebeiz. A Differential 4-bit 6.5-10Ghz RF MEMS Tunable Filter, IEEE Transactions on Microwave Theory and Techniques, vol. 53, No. 3, Mar. 2005.

Ignacio Llamas-Garro, Zabdiel Brito-Brito. Reconfigurable Microwave Filters, Microwave and Millimeter Wave Technologies from Phtonic Bandgap Devices to Antenna and Applications, Igor Minin (Ed.), ISBN: 978-953-7619-66-4. InTech. pp. 159-184.

Seung-Hun Lee, Hyuung-Jun Kin, Jong-In Song. Broadband photonic single sideband frequency up-converter based on the cross polarization modulation effect in a semiconductor optical amplifier for radio-over-fiber systems. Optics Express. Optical Society of America. vol. 22, No. 1. Jan. 2014.

Liam Riordan. Discrete- and Integrated Control of Power Amplifiers in Base-Station Applications, Analog Dialogue 42-04, Apr. 2009.

Mani Hossein-Zadeh, Kerry J. Vahala. Photonic RF Down-Converter Based on Optomechanical Oscillation. IEEE Photonics Technology Letters, vol. 20, No. 4. Feb. 15, 2008.

Avigor Brillant. Chapter 13, Laser Power and Temperature Control Loops, Digital and analog fiber optic communications for CATV and FTTx applications. ISBN: 978-0-8194-6757-7. 2008.

Nonfinal Office Action dated Aug. 22, 2016, in U.S. Appl. No. 14/788,777.

Notice of Allowance dated Jan. 19, 2017, in U.S. Appl. No. 14/788,777.

Nonfinal Office Action dated Sep. 26, 2016, in U.S. Appl. No. 14/630,638.

Nonfinal Office Action dated Oct. 21, 2016, in U.S. Appl. No. 14/630,639.

Notice of Allowance dated Mar. 9, 2017, in U.S. Appl. No. 14/630,639.

Notice of Allowance dated May 4, 2017, in U.S. Appl. No. 14/630,638.

* cited by examiner

SYSTEMS, DEVICES, AND METHODS FOR PHOTONIC TO RADIO FREQUENCY DOWNCONVERSION

Embodiments relate generally to systems, devices, and methods for photonic conversion and, more particularly, to systems, devices, and methods for photonic to radio frequency (RF) up/down conversion.

Broadband transmitters/receivers (up/down-converters) require frequency conversion between baseband/carrier signals to transmit information for a variety of communication and/or military applications. Frequency conversion can create spurs and harmonic products as undesirable side effects of the conversion process. To remove these frequency products costly and large filter banks have been utilized in broadband applications. Some tunable filter methods using micro-electro-mechanical systems (MEMS), single crystal ferrimagnetic garnets (YIG), or various transducer technologies have been unable to provide a fast tuning high rejection solution. Photonic to RF conversion technology is able to adaptively filter input RF signals, removing unwanted spurious and interfering products, and may replace traditional superhetrodyne RF frequency conversion architectures. However, existing frequency conversion systems that employ photonic to RF conversion technology present a relatively high conversion loss. There may be a need to apply photonic to RF conversion to adaptively filter RF signals without a relatively high conversion loss.

One embodiment includes a system for RF upconversion. The system can comprise a laser, a local oscillator, first and second electro-absorption modulators, a photonic filter, a photonic service filter, first and second photodiodes, and an RF mixer. The first electro-absorption modulator can be coupled to the laser to receive an optical signal from the laser. The first electro-absorption modulator can be configured to convert a received RF signal into the photonic domain by modulating the received optical signal based on the received RF signal to output a modulated optical signal. The photonic filter can be coupled to the first electro-absorption modulator to receive the modulated optical signal output by the first electro-absorption modulator. The photonic filter can be configured to output a filtered optical signal based on the received modulated optical signal. The first photodiode can be coupled to the photonic filter to receive the filtered optical signal from the photonic filter, and can be configured to convert the filtered optical signal into the RF domain to output a filtered RF signal. The second electro-absorption modulator can be coupled to the laser to receive the optical signal from the laser and can be coupled to the local oscillator to receive a LO signal from the local oscillator. The second electro-absorption modulator can be configured to convert the LO signal into the photonic domain by modulating the received optical signal based on the received LO signal to output an LO modulated optical signal. The photonic service filter can be coupled to the second electro-absorption modulator to receive the LO modulated optical signal output by the second electro-absorption modulator, and can be configured to output a filtered LO optical signal based on the received LO modulated optical signal. The second photodiode can be coupled to the photonic service filter to receive the filtered LO optical signal from the photonic service filter, and can be configured to convert the filtered LO optical signal into the RF domain to output a filtered LO signal. The RF mixer can be coupled to the first and second photodiodes to receive the filtered RF signal from the first photodiode and the filtered LO signal from the second photodiode, and can be configured to mix the filtered RF signal and the filtered LO signal to downconvert the filtered output and generate an intermediate frequency (IF) signal.

Another embodiment includes a device for RF upconversion. The device can comprise a photonic conversion stage, a photonic filter stage, an RF conversion stage, and an RF mixer stage. The photonic conversion stage can be coupled to a laser to receive an optical (FL) signal from the laser. The photonic conversion stage can be configured to convert a received RF signal to an optical signal and output the converted optical signal by modulating the received FL signal based on the received RF signal in a first optical signal processing path, and, in a second optical signal processing path, to convert a received local oscillator (LO) signal to an optical LO signal and output the converted optical LO signal by modulating the received FL signal based on the received LO signal. The photonic filter stage can be coupled to the photonic conversion stage to receive from the photonic conversion stage the converted optical signal and the converted optical LO signal, the photonic filter stage being configured to output a filtered optical signal by filtering the received converted optical signal in the first optical signal processing path, and, in the second optical signal processing path, to output a filtered optical LO signal by filtering the received converted optical LO signal. The RF conversion stage can be coupled to the photonic filter stage to receive the filtered optical signal and the filtered optical LO signal from the photonic filter stage. The RF conversion stage can be configured to convert the filtered optical signal to a filtered RF signal in the first optical signal processing path, and, in the second optical signal processing path, to convert the filtered optical LO signal to a filtered LO signal. The mixer stage can be coupled to the RF conversion stage to receive the filtered RF signal and the filtered LO signal, and can be configured to mix the filtered RF signal and the filtered LO signal to downconvert the filtered output and generate an intermediate frequency (IF) signal.

Another embodiment can include a method for RF upconversion. The method can comprise receiving an RF signal. In a first optical signal processing path, an optical signal generated by a laser can be modulated based on the received RF signal to generate a modulated optical signal. The modulated optical signal can be filtered in the first optical signal processing path to remove undesired spurious/interfering products to generate a filtered optical signal. The filtered optical signal can, in the first optical signal processing path, be converted to the RF domain to generate a filtered RF signal. In a second optical signal processing path, the optical signal generated by the laser can be modulated based on a local oscillator (LO) signal to generate a modulated optical LO signal. In the second optical signal processing path the modulated optical LO signal can be filtered to generate a filtered optical LO signal which can then be converted to the RF domain to generate a filtered LO signal. The filtered RF signal and the filtered LO signal can be mixed in the RF domain to downconvert the filtered output and generate an intermediate frequency (IF) signal.

DETAILED DESCRIPTION

Figure 1:
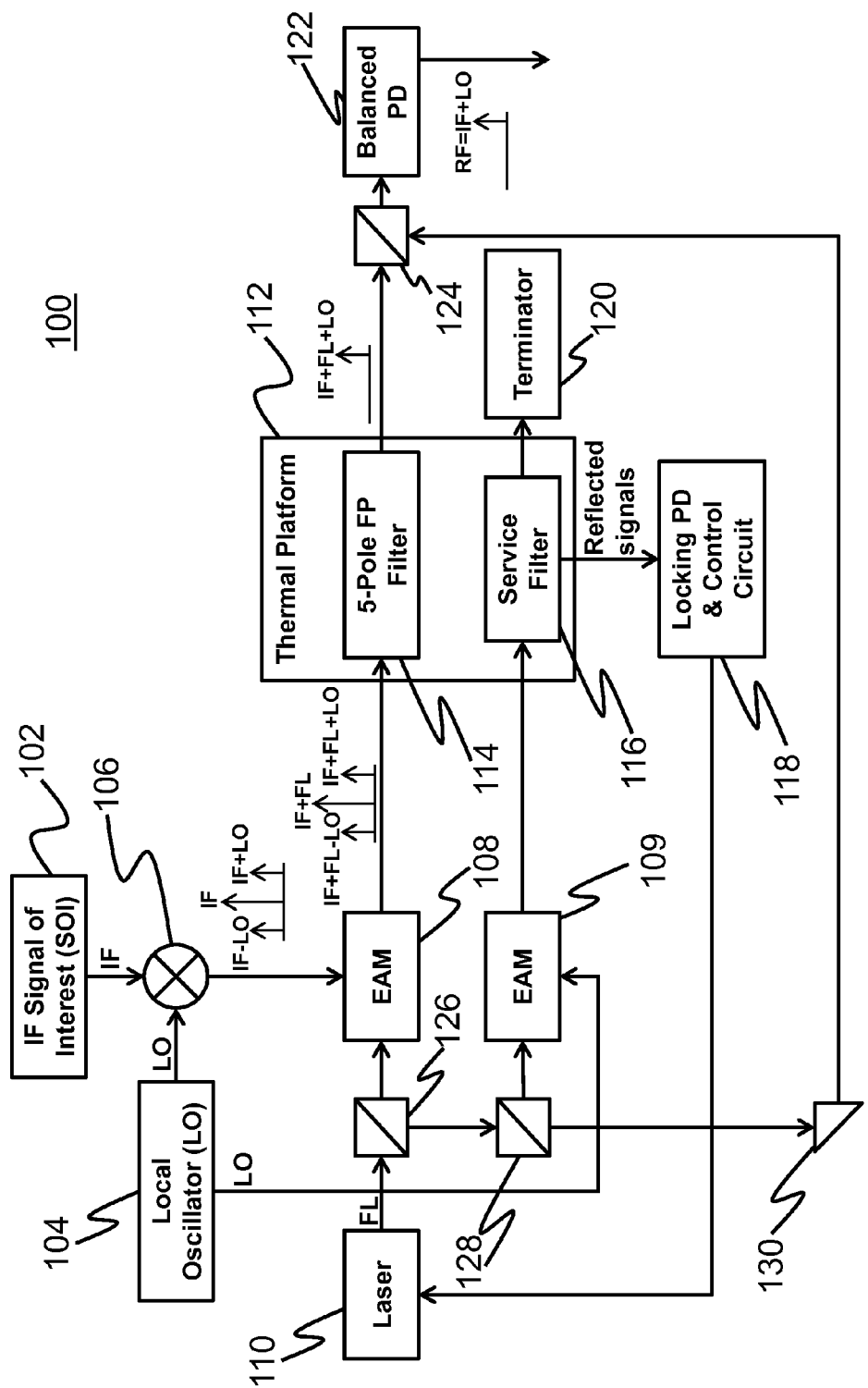
FIG. 1 is a schematic diagram of a photonic to RF converter (PRFC) upconverter, in accordance with an embodiment of the present disclosure.

FIG. 1 is a schematic diagram of a photonic to RF converter (PRFC) upconverter 100, in accordance with an embodiment of the present disclosure. PRFC upconverter 100 includes a local oscillator 104, a mixer 106, an electro-absorption modulator (or "EAM") 108, an electro-absorption modulator (or "EAM") 109, a thermal platform 112 which includes a filter (e.g., a 5-pole Fabry-Perot (FP) filter) 114 and a service filter 116, a controller (or "locking photodiode (PD) and laser power controller", or "locking PD and control circuit") 118, a terminator 120, a combiner 124, a balanced photodiode (PD) 122, a laser 110, a splitter 126, a splitter 128, and a mirror 130.

In operation, local oscillator 104 generates a local oscillator (LO) signal which is mixed with an IF signal of interest 102 is at mixer 106. Mixer 106 outputs a mixed signal to EAM 108. Laser 110 outputs an optical signal (FL) that is split by splitter 126 to EAM 108 and splitter 128. Splitter 128 further splits FL to EAM 109 and mirror 130. Mirror 130 reflects FL to combiner 124. EAM 108 receives FL and the mixed signal output by mixer 106, modulates FL based on the mixed signal, and outputs a modulated optical signal to filter 114. Filter 114 adaptively filters the received modulated optical signal to, for example, remove unwanted spurious and/or interfering products, and outputs a filtered optical signal to combiner 124. Combiner 124 outputs the filtered optical signal and FL (reflected by mirror 130) to balanced PD 122 which subtracts the signals from each other and generates an output RF signal. EAM 109 receives FL (from splitter 128) and LO (from local oscillator 104), modulates FL based on LO, and outputs an LO modulated optical signal to service filter 116 which then outputs a signal to controller 118 which can adaptively control laser 110 based on the signal received from service filter 116. Service filter 116 discriminates, for example, the product of the laser carrier and LO with sufficient selectivity to enable laser frequency control and/or locking.

Embodiments employ photonic to RF conversion to adaptively filter input RF signals such as, for example, IF 102 and RF 302 shown in FIG. 3 below, removing unwanted spurious and interfering products. Some embodiments can be provided in a smaller package than other devices studied by the inventors that use switched filter banks, with more flexibility allowing for a SWAP-C (size, weight, power, and cost) improvement over such devices. Embodiments are able to provide single stage un-ambiguous conversion eliminating the need for a second mixing stage and associated frequency ambiguity issues encountered in other broad-band superhetrodyne up/down conversion systems studied by the inventors. Also, embodiments can apply filtering to the local oscillator source such as, for example, local oscillators 104 and 308, eliminating the need for high spur and harmonic suppression synthesizers seen in devices studied by the inventors, which can reduce system cost and also reduce size/weight considerations. Embodiments reduce conversion loss by reducing the number of RF to photonic conversion stages used in the upconversion process. The number of RF to photonic conversion stages can be reduced by using a mixer such as, for example, mixer 106 or a mixer and a broadband amplifier before the adaptive filtering stage (eliminating, for example, a weak optical hetrodyne stage used in other devices studied by the inventors such as those in which conversion is self-contained in the photonic domain). This allows embodiments to take full advantage of the adaptive filtering of the LO and RF input without the high conversion loss which may be associated with photonic conversion.

In some devices studied by the inventors, conversion is self-contained in the photonic domain leading to high conversion losses. Additionally, devices/methods of tunable filtering studied by the inventors suffer from large size, poor filter rejection, limited bandwidth, poor reliability, and/or slow tuning times. Embodiments filter undesirable products of frequency conversion (e.g., spurs and harmonic products) adaptively without the normal trade-offs associated with tunable filters, while providing, in some embodiments, a space saving solution ideally suited for compact platforms. Embodiments provide a hybrid solution of semiconductor and photonic technology that can move seamlessly between the optical and RF domains, which allows for the advantages of both technologies (low conversion loss and adaptive filtering) to be utilized effectively. The losses associated with photonic conversion devices/methods studied by the inventors can be reduced by this hybrid approach which increases conversion gain and/or reduces conversion loss.

It will be appreciated that filter 114 can be a photonic filter such as, for example, any microwave photonic filter including, for example, a 5-pole Fabry-Perot (FP) microwave photonic filter. Additionally or alternatively, filter 114 can comprise filters such as, for example, a fiber Bragg gratings (FBG) filter, whispering-gallery-mode (WGM) resonator filters, etalons, and/or Lyot filters.

It will also be appreciated that mixer 106 can be any kind of mixer or frequency mixer comprising, for example, Schottky diodes, gallium arsenide field-effect transistor (GaAs FETs), complementary metal-oxide-semiconductor (CMOS) transistors, and/or any other non-linear element.

Although not shown, some embodiments are configured to perform adaptive equalization of PRFC upconverter 100 according to, for example, the adaptive equalization detailed in U.S. patent application Ser. No. 14/630,638, filed Feb. 24, 2015, which is hereby incorporated by reference herein in its entirety. Some such embodiments include a system such as system 100 of the '638 application to perform adaptive equalization of PRFC upconverter 100. In some embodiments, PRFC upconverter 100 is coupled to an EAM bias controller such as the EAM bias controller 114/308 of the '638 application. In some embodiments, controller 118 is configured as the EAM bias controller 114/308 of the '638 application.

In some embodiments, PRFC upconverter 100 includes a thermoelectric cooler (not shown). Although not shown, some embodiments are configured to adaptively control the thermoelectric cooler of PRFC upconverter 100 and/or laser 110 to maintain precise operation of laser 110 according to, for example, the adaptive control detailed in U.S. patent application Ser. No. 14/630,639, filed Feb. 24, 2015, which is hereby incorporated by reference herein in its entirety. Some such embodiments include a system such as system 100 of the '639 application to maintain precise operation of laser 110 of PRFC upconverter 100. In some embodiments, PRFC upconverter 100 is coupled to a laser power controller such as the laser power controller 116 of the '639 application. In some embodiments, controller 118 is configured as the laser power controller 116 of the '639 application. In some embodiments, PRFC upconverter 100 is coupled to a thermoelectric cooler controller such as the TEC controller 110 of the '639 application.

Figure 2:
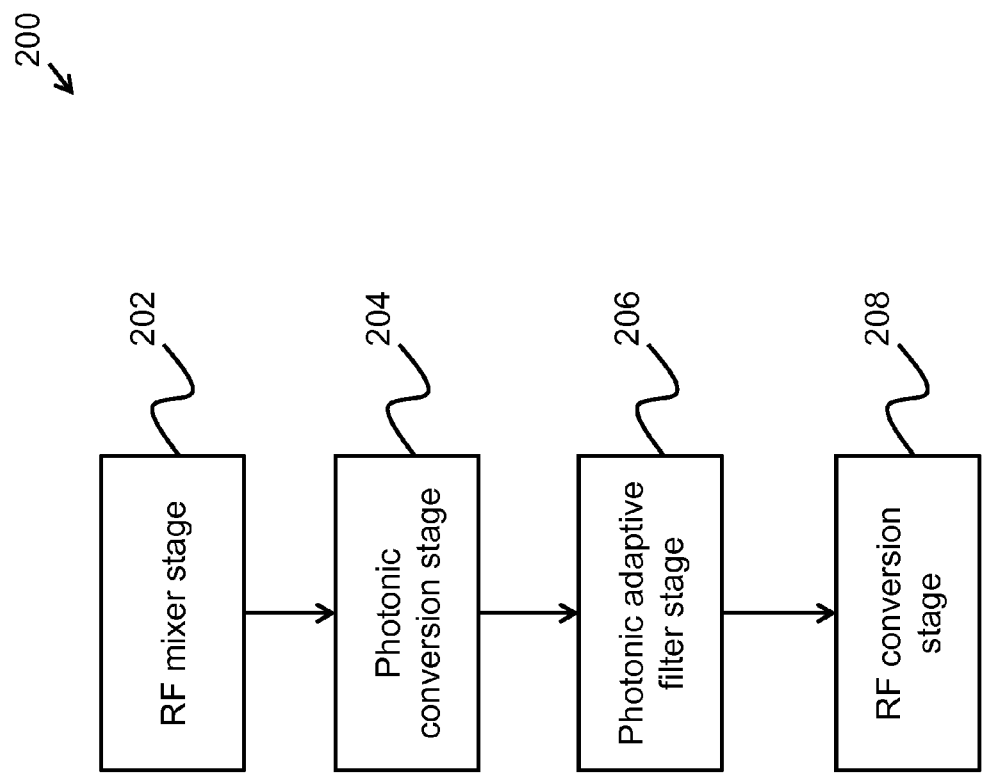
FIG. 2 is a functional block diagram of a PRFC upconverter, in accordance with an embodiment of the present disclosure.

FIG. 2 is a functional block diagram of a PRFC upconverter 200, in accordance with an embodiment of the present disclosure. PRFC upconverter 200 includes an RF mixer stage 202, a photonic conversion stage (or "RF to photonic conversion stage") 204, a photonic adaptive filtering stage 206, and an RF conversion stage (or "photonic to RF conversion stage") 206.

Mixer stage 202 can be coupled to a local oscillator to receive a local oscillator (LO) signal form the local oscillator. The mixer stage 202 can be configured to mix an intermediate frequency (IF) signal with the received LO signal to output a mixed RF signal. Photonic conversion stage 204 can be coupled to mixer stage 202 to receive the mixed RF signal from mixer stage 202. Photonic conversion stage 204 can also be coupled to a laser to receive an optical (FL) signal from the laser. Photonic conversion stage 204 can be configured to, for a first optical signal processing path, convert the received mixed RF signal to an optical signal and output the converted optical signal by modulating the received FL signal based on the received mixed RF signal. Photonic filter stage 206 can be coupled to photonic conversion stage 204 to receive the converted signal from photonic conversion stage 204. Photonic filter stage 206 can also be configured to filter the converted optical signal to, for example, remove unwanted spurious and/or interfering products from the converted optical signal, and output a filtered signal. RF conversion stage 208 can be coupled to photonic filter stage 206 to receive the filtered signal from photonic filter stage 206 and output an upconverted RF signal by converting the received filtered signal to the RF domain.

In some embodiments, photonic conversion stage 204 can be configured to, for a second separate optical signal processing path, receive the LO and FL signals and convert the LO signal to an optical LO signal and output the converted LO optical signal by modulating the received FL signal based on the received LO signal. In such embodiments, the photonic filter stage 206 can receive the converted LO optical signal from photonic conversion stage 204. In such embodiments, PRFC upconverter 200 can include a controller configured to control the laser based on a signal received from photonic filter stage 206 (the signal received from photonic filter stage 206 being based on the converted LO optical signal such as, for example, the converted LO optical signal reflected by photonic filter stage 206).

In some embodiments mixer stage 202 can include a mixer such as, for example, mixer 106, the first optical signal processing path of photonic conversion stage 204 can include an optical modulator such as, for example, EAM 108, photonic filter stage 206 can include a filter such as, for example, filter 114, and RF conversion stage 208 can include a photodiode such as, for example, photodiode 122.

In some embodiments, the second optical signal processing path of photonic conversion stage 204 can include a second EAM such as, for example, EAM 109 and photonic filter stage 206 can also include a second filter such as, for example, service filter 116.

In some embodiments, a baseband amplifier stage is included before photonic conversion stage 206 and/or photonic filter stage 208. By applying RF mixer stage 204 and/or the amplifier stage in the RF (e.g., microwave) domain prior to photonic filter stage 208, embodiments can eliminate a weak optical heterodyne stage included in systems studied by the inventors in which all conversion is self-contained in the photonic domain. Such a weak optical heterodyne stage can lead to high conversion losses and by eliminating this stage embodiments provide photonic adaptive filtering without the high conversion losses associated with such weak optical heterodyne stages.

Figure 3:
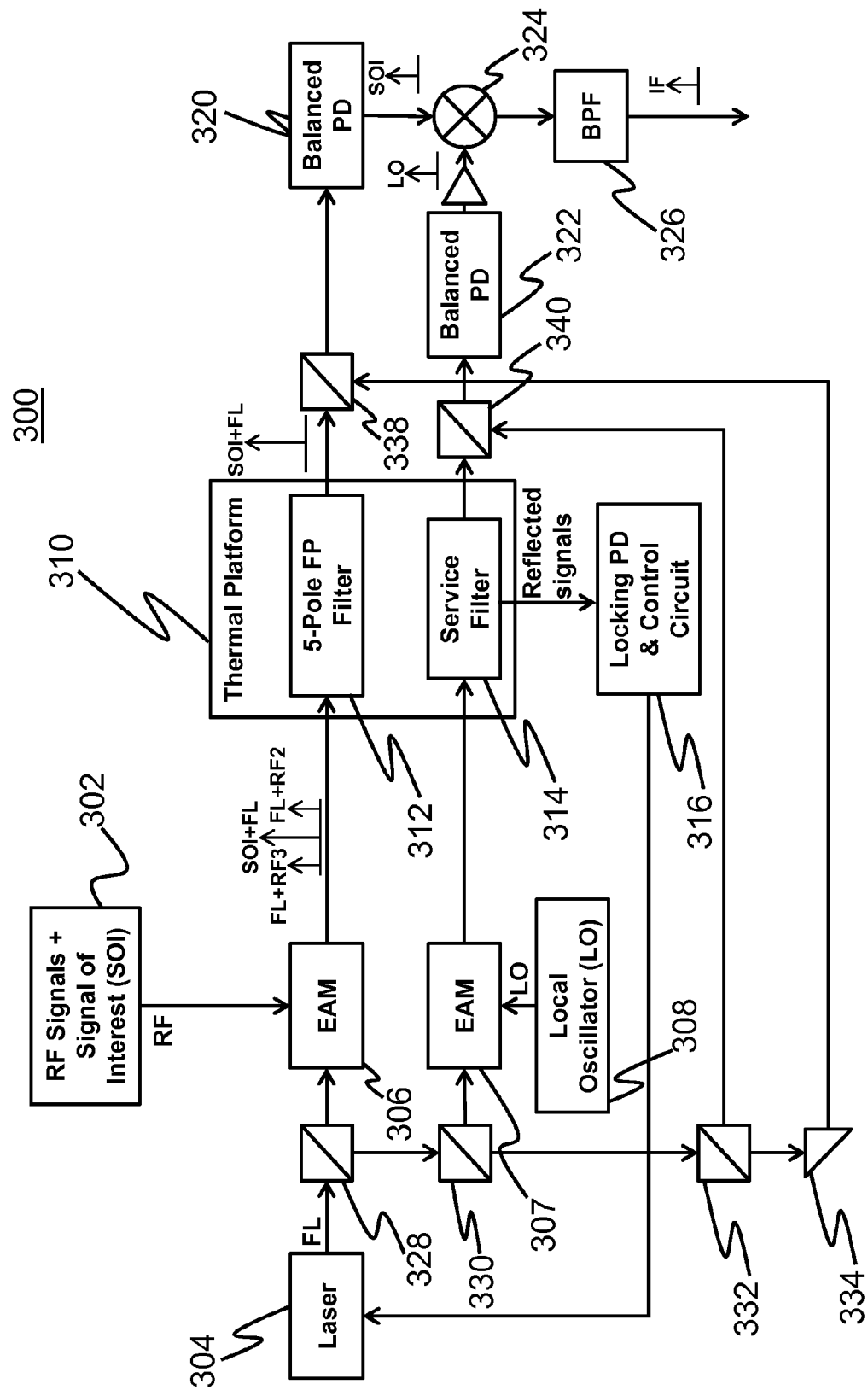
FIG. 3 is a schematic diagram of a PRFC downconverter, in accordance with an embodiment of the present disclosure.

FIG. 3 is a schematic diagram of a PRFC downconverter 300, in accordance with an embodiment of the present disclosure. PRFC downconverter 300 includes a laser 304, an electro-absorption modulator (EAM) 306, an electro-absorption modulator (EAM) 307, a local oscillator 308, a thermal platform 310 including a filter (or "5-pole FP filter") 312 and a service filter 314, a controller (or "locking photodiode (PD) and laser power controller", or "locking PD and control circuit") 316, photodiodes (PDs) 320 and 322, bandpass filter 326, splitters 328-332, combiners 338-340, and mirror 334.

In operation, laser 304 outputs an optical signal (FL) to splitter 328 which splits FL to EAM 306 and splitter 330. Splitter 330 further splits FL to EAM 307 and splitter 332. Splitter 332 further splits FL to combiner 340 and mirror 334 which reflects FL to combiner 338. EAM 306 converts RF signal 302 into an optical signal by modulating the FL signal based on the received RF signal 302 to output a modulated FL signal to filter 312. Filter 312 filters the modulated FL signal to, for example, remove unwanted spurious and/or interfering products, and outputs a filtered optical signal to combiner 338. Combiner 338 outputs the filtered optical signal and the FL signal (received from mirror 334) to photodiode 320 which subtracts the FL signal from the filtered optical signal and converts the result to a filtered RF signal in the RF domain which is output to mixer 324.

In a second optical signal processing path, EAM 307 converts an LO signal received from local oscillator 308 to a converted LO optical signal by modulating the FL signal based on the LO signal to output an LO modulated FL signal to service filter 314. Service filter 314 can output a signal to controller 316 which can adaptively control laser 304 based on the signal received from service filter 314. Service filter 314 can output a signal based on the LO modulated FL signal to combiner 340. Combiner 340 outputs the signal received from service filter 314 and the FL signal (received from splitter 332) to photodiode 322 which subtracts the signals and converts the result to a filtered LO signal in the RF domain which is output to mixer 324. Mixer 324 mixes the signals received from PD 320 and PD 322 and outputs a mixed RF signal bandpass filter 326 which outputs an intermediate frequency (IF) signal.

In embodiments, mixer 324 is an RF (e.g., microwave) mixer, and by using mixer 324 after the adaptive photonic filtering, such embodiments can eliminate a weak optical heterodyne stage included in systems studied by the inventors in which all conversion is self-contained in the photonic domain. Such a weak optical heterodyne stage can lead to high conversion losses and by eliminating this stage (by reducing the number of RF to photonic conversion stages) embodiments provide photonic adaptive filtering without the high conversion losses associated with such a weak optical heterodyne stage.

It will be appreciated that filter 312 can be a photonic filter such as, for example, any microwave photonic filter including, for example, a 5-pole Fabry-Perot (FP) microwave photonic filter.

It will also be appreciated that mixer 324 can be any kind of mixer or frequency mixer comprising, for example, Schottky diodes, gallium arsenide field-effect transistor (GaAs FETs), complementary metal-oxide-semiconductor (CMOS) transistors, and/or the like.

Although not shown, some embodiments are configured to perform adaptive equalization of PRFC downconverter 300 according to, for example, the adaptive equalization detailed in U.S. patent application Ser. No. 14/630,638, filed Feb. 24, 2015, which has been incorporated by reference herein in its entirety. Some such embodiments include a system such as system 100 of the '638 application to perform adaptive equalization of PRFC downconverter 300. In some embodiments, PRFC downconverter 300 is coupled to an EAM bias controller such as the EAM bias controller 114/308 of the '638 application. In some embodiments, controller 316 is configured as the EAM bias controller 114/308 of the '638 application.

In some embodiments, PRFC downconverter 300 includes a thermoelectric cooler (not shown). Although not shown, some embodiments are configured to adaptively control the thermoelectric cooler of PRFC downconverter 300 and/or laser 304 to maintain precise operation of laser 304 according to, for example, the adaptive control detailed in U.S. patent application Ser. No. 14/630,639, filed Feb. 24, 2015, which has been incorporated by reference herein in its entirety. Some such embodiments include a system such as system 100 of the '639 application to maintain precise operation of laser 304 of PRFC downconverter 300. In some embodiments, PRFC downconverter 300 is coupled to a laser power controller such as the laser power controller 116 of the '639 application. In some embodiments, controller 316 is configured as the laser power controller 116 of the '639 application. In some embodiments, PRFC downconverter 300 is coupled to a thermoelectric cooler controller such as the TEC controller 110 of the '639 application.

Figure 4:
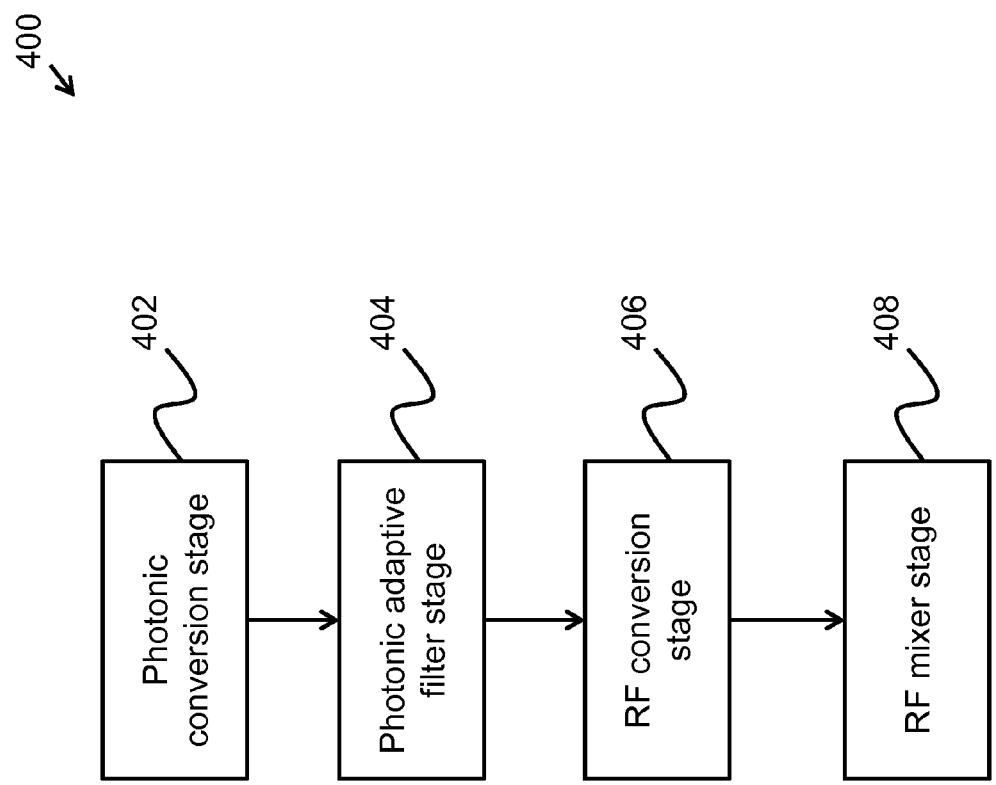
FIG. 4 is a functional block diagram of a PRFC downconverter, in accordance with an embodiment of the present disclosure.

FIG. 4 is a functional block diagram of a PRFC downconverter 400, in accordance with an embodiment of the present disclosure. PRFC downconverter 400 includes photonic conversion stage 402, a photonic adaptive filtering stage 404, an RF conversion stage 406, and a mixer stage 408.

Photonic conversion stage 402 can, in a first optical signal processing path, convert an input RF signal into an optical signal by modulating an optical (FL) signal (generated by a laser) based on the RF signal. Photonic filter stage 404 can be coupled to photonic conversion stage 402 to receive the converted/modulated optical signal. Photonic filter stage 404 can be configured to filter the converted optical signal to, for example, remove unwanted spurious and/or interfering products from the converted optical signal, and output a filtered optical signal to RF conversion stage 406 which converts the filtered optical signal into an RF filtered signal.

In a second optical processing path, photonic conversion stage 402 can receive a local oscillator (LO) signal and the FL signal and convert the LO signal to an optical LO signal by modulating the FL signal based on the LO signal. Photonic filter stage 404 can receive the optical LO signal from photonic conversion stage 402 and output a signal based on the optical LO signal to a controller that can control the laser (e.g., frequency) based on the feedback provided by photonic filter stage 404. Photonic filter stage 404 can also output a signal based on the optical LO signal to RF conversion stage 406 which converts the signal into an LO filtered signal in the RF domain.

RF mixer stage 408 receives the LO filtered signal and the RF filtered signal from RF conversion stage 406, mixes the signals in the RF domain, and outputs an intermediate frequency (IF) signal.

In some embodiments, in the first optical signal processing path, photonic conversion stage 402 can include an optical modulator such as, for example, EAM 306, photonic filter stage 404 can include a filter such as, for example, filter 312, and RF conversion stage 406 can include a photodiode such as, for example, photodiode 320. In some embodiments, in the second optical signal processing path, photonic conversion stage 402 can include a second EAM such as, for example, EAM 307, photonic filter stage 404 can include a second filter such as, for example, service filter 314, and RF conversion stage 406 can include a second photodiode such as, for example, photodiode 322. In some embodiments mixer stage 408 can include a mixer such as, for example, mixer 324. In some embodiments, although not shown, a bandpass filter stage is included after RF mixer stage 408.

By separating optical signal processing into two paths, filtering the RF and the LO signals separately in each path, and applying RF mixer stage 408 in the RF (e.g., microwave) domain after photonic filter stage 208, embodiments can eliminate a weak optical heterodyne stage included in systems studied by the inventors in which all conversion is self-contained in the photonic domain. Such a weak optical heterodyne stage can lead to high conversion losses and by eliminating this stage embodiments provide photonic adaptive filtering without the high conversion losses associated with such weak optical heterodyne stages.

Figure 5:
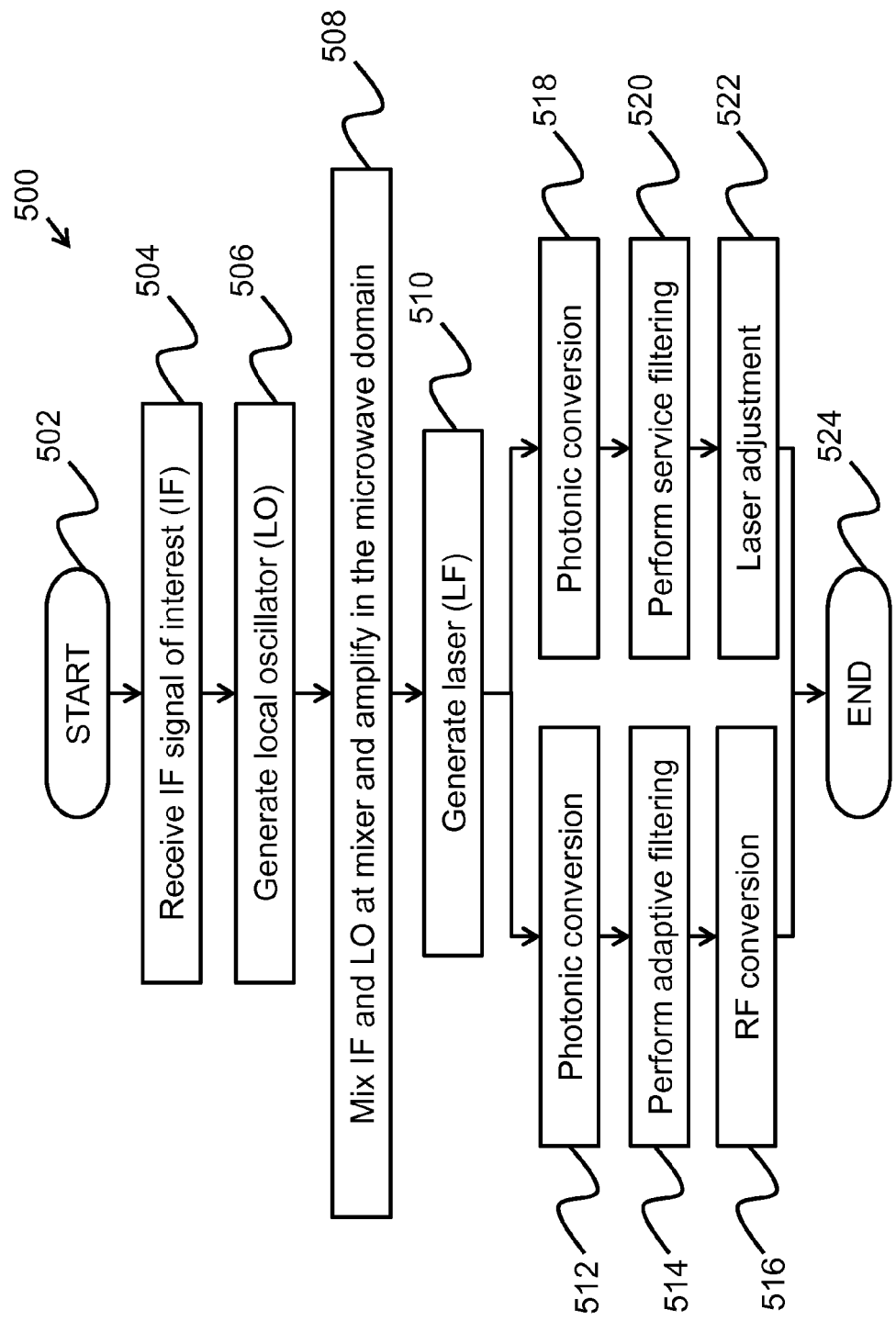
FIG. 5 is a flowchart showing a method for photonic to RF upconversion, in accordance with an embodiment of the present disclosure.

FIG. 5 is a flowchart showing a method 500 for photonic to RF upconversion, in accordance with an embodiment of the present disclosure. Processing begins at 502 and continues to 504.

At 504, an IF signal of interest is received. Processing continues to 506.

At 506, a local oscillator (LO) signal is generated. Processing continues to 508.

At 508, the IF and LO signals are mixed at a mixer such as, for example, mixer 106. Processing continues to 510.

At 510, a laser (LF) is generated. Signal processing cab be separated into two paths and processing continues to 512 and 514. In some embodiments, amplification can be performed in the microwave domain by, for example, a baseband amplifier, prior to photonic adaptive filtering.

At 512, photonic conversion is performed by modulating the LF signal based on the output from the mixer to generate a converted/modulated optical signal. Photonic conversion can be performed by an electro-absorption modulator such as, for example, EAM 108. Processing continues to 514.

At 514, adaptive filtering is performed in the photonic domain. Adaptive filtering can be performed by a photonic filter such as, for example, filter 114, on the converted/modulated optical signal output by the electro-absorption modulator at 512 to, for example, remove unwanted spurious and/or interfering products from the converted/modulated optical signal. Processing continues to 516.

At 516, upconverted RF output is generated based on the filtered optical signal. Generating upconverted RF output can be performed by a combiner such as, for example, combiner 124 and a photodiode such as, for example, photodiode 122. The combiner can receive the FL signal and combine the FL signal and the filtered optical signal and output the signals to the photodiode which can subtract the signals and convert the result to an upconverted RF signal in the RF domain.

At 518, photonic conversion is performed by modulating the LF signal based on the LO signal to generate an LO modulated optical signal. This photonic conversion can be performed by an electro-absorption modulator such as, for example, EAM 109. Processing continues to 520.

At 520, service filtering is performed in the photonic domain. Processing continues to 522.

At 522, laser adjustment is performed based on an output of the service filtering at 520. Laser adjustment can be performed by a controller such as, for example, controller 118. In some embodiments, laser adjustment can maintain transmission of agile sideband through active feedback to adjust laser carrier frequency. Processing continues to 524, where processing ends.

It will be appreciated that operations 504-522 may be repeated in whole or in part to perform continuous photonic to RF upconversion.

Figure 6:
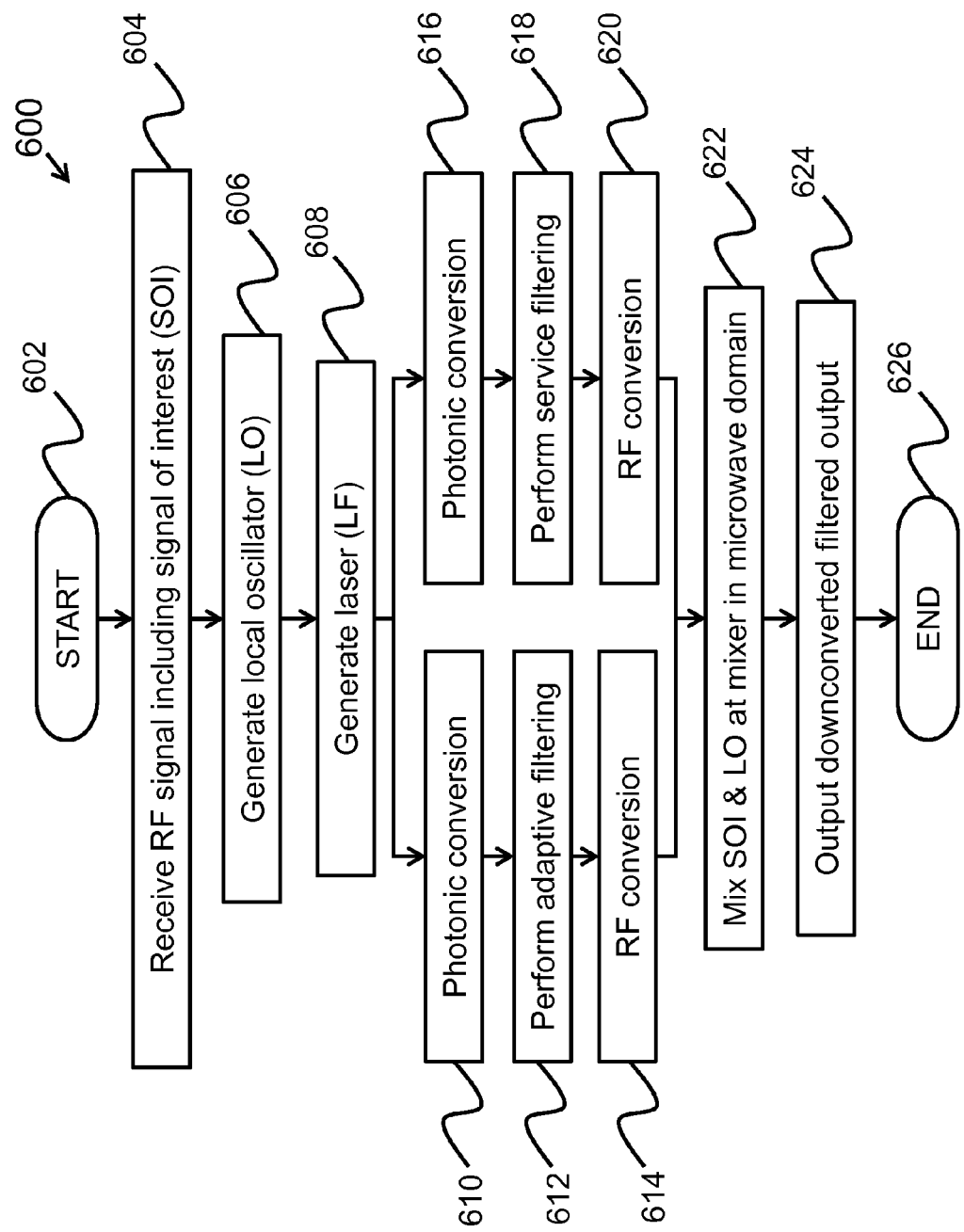
FIG. 6 is a flowchart showing a method for photonic to RF downconversion, in accordance with an embodiment of the present disclosure.

FIG. 6 is a flowchart showing a method 600 for photonic to RF downconversion, in accordance with an embodiment of the present disclosure. Processing begins at 602 and continues to 604.

At 604, an RF signal including a signal of interest (SOI) is received. Processing continues to 606.

At 606, a local oscillator (LO) signal is generated. Processing continues to 608.

At 608, a laser (LF) is generated. Optical signal processing is separated into two separate paths and processing continues to 610 and 616.

At 610, photonic conversion is performed by modulating the LF signal based on the RF signal to generate a converted/modulated optical signal. Photonic conversion can be performed by an electro-absorption modulator such as, for example, EAM 306. Processing continues to 612.

At 612, adaptive filtering is performed in the photonic domain. Adaptive filtering can be performed by a photonic filter such as, for example, filter 312, on the converted/modulated optical signal output by the electro-absorption modulator at 610 to, for example, remove unwanted spurious and/or interfering products from the converted/modulated optical signal. Processing continues to 614.

At 614, RF conversion is performed to convert the filtered optical signal generated at 612 into a filtered RF signal in the RF domain. Processing continues to 622.

At 616, photonic conversion is performed by modulating the LF signal based on the LO signal to generate an LO converted/modulated optical signal. This photonic conversion can be performed by an electro-absorption modulator such as, for example, EAM 307. Processing continues to 618.

At 618, service filtering is performed in the photonic domain. The service filtering can be performed by a filter such as, for example, service filter 314. In some embodiments, laser adjustment is performed based on an output of the service filtering at 618. Laser adjustment can be performed by a controller such as, for example, controller 316. In some embodiments, laser adjustment can maintain transmission of agile sideband through active feedback to adjust laser carrier frequency. Processing continues to 620.

At 614, RF conversion is performed to convert the filtered LO optical signal generated at 618 into a filtered LO signal in the RF domain. Processing continues to 622.

At 622, the filtered RF signal and the filtered LO signals are mixed at a mixer. The signals can be mixed by a mixer such as, for example, mixer 324 and then filtered by a filter such as bandpass filter 326 to downconvert the filtered output. Processing continues to 624.

At 618, the downconverted filtered output is output as the intermediate frequency (IF) signal, where processing ends.

It will be appreciated that operations 604-624 may be repeated in whole or in part (an example of which is indicated by line 614) to maintain current (regularly or continuously updated).

It will be appreciated that the modules, processes, systems, and sections described above can be implemented in hardware, hardware programmed by software, software instructions stored on a nontransitory computer readable medium or a combination of the above. A system for photonic to RF up/down conversion, for example, can include using a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as C, Ada, Java, C++, C#.net or the like. The instructions can also comprise code and data objects provided in accordance with, for example, the Visual Basic™ language, or another structured or object-oriented programming language. The sequence of programmed instructions and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Exemplary structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non-transitory computer readable medium).

Furthermore, embodiments of the disclosed method, system, and computer program product may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the computer programming and network security arts.

Moreover, embodiments of the disclosed method, system, and computer program product can be implemented in software executed on a programmed general purpose computer, a special purpose computer, a microprocessor, or the like.

It is, therefore, apparent that there is provided, in accordance with the various embodiments disclosed herein, systems, devices, and methods for photonic to RF up/down conversion.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A communication device for radio frequency (RF) downconversion, the communication device comprising:
   a laser;
   a local oscillator;
   a first electro-absorption modulator coupled to the laser to receive an optical signal from the laser, the first electro-absorption modulator configured to convert a received RF signal into the photonic domain by modulating the received optical signal based on the received RF signal to output a modulated optical signal;
   a photonic filter coupled to the first electro-absorption modulator to receive the modulated optical signal output by the first electro-absorption modulator, the photonic filter being configured to output a filtered optical signal based on the received modulated optical signal;
   a first combiner coupled to the photonic filter to receive the filtered optical signal from the photonic filter, coupled to the laser to receive the optical signal from the laser, and coupled to the first photodiode to output a signal based on the filtered optical signal and the optical signal;
   a first photodiode coupled to the photonic filter to receive the filtered optical signal from the photonic filter, the first photodiode being configured to convert the filtered optical signal into the RF domain to output a filtered RF signal;
   a second electro-absorption modulator coupled to the laser to receive the optical signal from the laser and coupled to the local oscillator to receive a LO signal from the local oscillator, the second electro-absorption modulator configured to convert the LO signal into the photonic domain by modulating the received optical signal based on the received LO signal to output an LO modulated optical signal;
   a photonic service filter coupled to the second electro-absorption modulator to receive the LO modulated optical signal output by the second electro-absorption modulator, the photonic service filter being configured to output a filtered LO optical signal based on the received LO modulated optical signal;
   a second combiner coupled to the photonic service filter to receive the filtered LO optical signal from the photonic filter, coupled to the laser to receive the optical signal from the laser, and coupled to the second photodiode to output a signal based on the filtered LO optical signal and the optical signal, wherein the first and second combiners are separate from each other;
   a second photodiode coupled to the photonic service filter to receive the signal based on the filtered LO optical signal and the optical signal from the second combiner, the second photodiode being configured to convert the filtered LO optical signal into the RF domain to output a filtered LO signal;
   an RF mixer coupled to the first and second photodiodes to receive the filtered RF signal from the first photodiode and the filtered LO signal from the second photodiode, the RF mixer configured to mix the filtered RF signal and the filtered LO signal to downconvert filtered output and generate an intermediate frequency (IF) signal.

2. The device of claim 1, further comprising:
   a locking photodiode and laser power controller coupled to the photonic service filter to receive a reflected signal based on the LO modulated optical signal from the photonic service filter, the controller also being coupled to the laser to control the laser to perform a laser adjustment based on the reflected signal received from the photonic service filter,
   wherein the photonic filter is centered on sideband by the laser adjustment.

3. The device of claim 1, further comprising:
   a band pass filter configured to receive the downconverted filtered output from the RF mixer and to output an intermediate frequency (IF) signal.

4. The device of claim 1, wherein the RF mixer is a microwave RF mixer.

5. The device of claim 4, wherein the photonic filter is a microwave photonic filter.

6. The device of claim 5, wherein the photonic filter is a Fabry-Pérot filter.

7. The device of claim 6, wherein the photonic filter is a five pole Fabry-Pérot filter.

8. The device of claim 2, wherein the performing a laser adjustment includes adjusting the power of the laser based on the reflected signal received form the photonic service filter.

9. A communication device for radio frequency (RF) downconversion, the communication device comprising:
   a photonic conversion stage coupled to a laser to receive an optical (FL) signal from the laser, the photonic conversion stage being configured to
   (i) in a first optical signal processing path, convert a received RF signal to an optical signal and output the converted optical signal by modulating the received FL signal based on the received RF signal, and (ii) in a second optical signal processing path, convert a received local oscillator (LO) signal to an optical LO signal and output the converted optical LO signal by modulating the received FL signal based on the received LO signal;

a photonic filter stage coupled to the photonic conversion stage to receive from the photonic conversion stage the converted optical signal and the converted optical LO signal, the photonic filter stage being configured to
(i) in the first optical signal processing path, output a filtered optical signal by filtering the received converted optical signal, and
(ii) in the second optical signal processing path, output a filtered optical LO signal by filtering the received converted optical LO signal;

a combiner stage coupled to the photonic filter stage to receive from the photonic filter stage the filtered optical signal and the filtered optical LO signal, the combiner stage being configured to
(i) in the first optical signal processing path, output a combined optical signal from a first combiner by combining the filtered optical signal from the photonic filter stage with the received FL signal, and
(ii) in the second optical signal processing path, output a combined optical LO signal from a second combiner by combining the filtered optical LO signal from the photonic filter stage with the received FL signal,
wherein the first and second combiners are separate from each other, an RF conversion stage coupled to the combiner stage to receive the combined optical signal and the combined optical LO signal from the photonic filter stage, the RF conversion stage being configured to
(i) in the first optical signal processing path, convert the combined optical signal to a filtered RF signal, and
(ii) in the second optical signal processing path, convert the combined optical LO signal to a filtered LO signal; and a mixer stage coupled to the RF conversion stage to receive the filtered RF signal and the filtered LO signal, the mixer stage being configured to mix the filtered RF signal and the filtered LO signal to downconvert the filtered output and generate an intermediate frequency (IF) signal.

10. The device of claim 9, further comprising:
a controller coupled to the photonic filter stage to receive a signal based on the converted optical LO signal from the photonic filter stage, the controller being further coupled to the laser to control the laser to perform a laser adjustment based on the signal received form the photonic filter stage,
wherein the photonic filter stage is centered on sideband by the laser adjustment.

11. The device of claim 9, wherein the mixer stage comprises a microwave RF mixer.

12. The device of claim 11, wherein the photonic conversion stage comprises an electro-absorption modulator.

13. The device of claim 12, wherein the photonic filter stage comprises a photonic microwave filter.

14. The device of claim 13, wherein the photonic microwave filter is a Fabry-Pérot filter.

15. The device of claim 13, wherein the photonic microwave filter is a five pole Fabry-Pérot filter.

16. A method for RF downconversion, the method comprising:
receiving an RF signal;
modulating, based on the received RF signal and in a first optical signal processing path, an optical signal generated by a laser to generate a modulated optical signal;
modulating, based on a local oscillator (LO) signal and in a second optical signal processing path, the optical signal generated by the laser to generate a modulated optical LO signal;
filtering, in the first optical signal processing path, the modulated optical signal to remove undesired spurious/interfering products to generate a filtered optical signal;
filtering, in the second optical signal processing path, the modulated optical LO signal to generate a filtered optical LO signal;
combining, in the first optical signal processing path, the filtered optical signal with the optical signal generated by the laser to generate a combined optical signal using a first combiner;
combining, in the second optical signal processing path, the filtered optical LO signal with the optical signal generated by the laser to generate a combined optical LO signal using a second combiner, wherein the first and second combiners are separate from each other;
converting, in the first optical signal processing path, the combined optical signal to the RF domain to generate a filtered RF signal;
converting, in the second optical signal processing path, the combined optical LO signal to the RF domain to generate a filtered LO signal;
mixing, at a mixer, the filtered RF signal and the filtered LO signal in the RF domain to downconvert the filtered output and generate an intermediate frequency (IF) signal.

17. The method of claim 16, the method further comprising:
controlling the laser generating the optical signal via active feedback to perform a laser adjustment based on the modulated optical LO signal to center the filtering on sideband.

18. The method of claim 17, wherein the performing the laser adjustment includes adjusting the power of the laser based on the modulated optical LO signal.

19. The device of claim 16, wherein the filtering, in the first optical signal processing path, includes filtering modulated optical signal with a photonic microware filter.

20. The device of claim 16, wherein the photonic microware filter is a five pole Fabry-Perot filter.

* * * * *